US008447477B2

(12) United States Patent
Harada et al.

(10) Patent No.: US 8,447,477 B2
(45) Date of Patent: May 21, 2013

(54) FORKLIFT ENGINE CONTROL DEVICE

(75) Inventors: Yasuo Harada, Oyama (JP); Yoshitaka Onodera, Hiratsuka (JP); Jun Hashimoto, Chigasaki (JP); Hideyuki Hiraiwa, Tochigi (JP); Kazunori Nishimura, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/640,247

(22) PCT Filed: Sep. 13, 2011

(86) PCT No.: PCT/JP2011/070881
§ 371 (c)(1),
(2), (4) Date: Nov. 30, 2012

(87) PCT Pub. No.: WO2012/036163
PCT Pub. Date: Mar. 22, 2012

(65) Prior Publication Data
US 2013/0073152 A1   Mar. 21, 2013

(30) Foreign Application Priority Data

Sep. 13, 2010  (JP) ................................. 2010-204846

(51) Int. Cl.
*G06F 7/70* (2006.01)

(52) U.S. Cl.
USPC ............... 701/50; 701/103; 701/110; 701/51; 701/53; 701/54; 701/58; 701/100; 187/224; 187/222; 123/350; 180/338; 180/305; 180/306; 180/307

(58) Field of Classification Search
USPC ............... 701/103, 110, 50, 51, 53, 54, 58, 701/100; 180/338, 305, 306, 307; 123/350; 187/224, 222
See application file for complete search history.

(56) References Cited

U.S. PATENT DOCUMENTS

| 7,278,508 | B2 * | 10/2007 | Nakada et al. ............... 180/305 |
| 7,366,600 | B2 * | 4/2008 | Osaki et al. ..................... 701/50 |
| 2006/0260877 | A1 * | 11/2006 | Ito et al. ....................... 187/224 |
| 2007/0016355 | A1 | 1/2007 | Kamado et al. |

FOREIGN PATENT DOCUMENTS

| JP | A-2003-054899 | 2/2003 |
| JP | A-2006-321625 | 11/2006 |
| JP | A-2007-040301 | 2/2007 |
| JP | A-2010-006604 | 1/2010 |
| JP | A-2010-174972 | 8/2010 |
| WO | WO 2005/024208 A1 | 3/2005 |

OTHER PUBLICATIONS

Dec. 13, 2011 International Search Report issued in International Patent Application No. PCT/JP2011/070881.

* cited by examiner

*Primary Examiner* — Redhwan K Mawari
(74) *Attorney, Agent, or Firm* — Oliff & Berridge, PLC (57) ABSTRACT

A control device of a forklift engine that secures operability by keeping down fuel consumption when the accelerator pedal is floored in an unloaded or lightly loaded state, and once a heavy cargo is loaded, by lifting the cargo at a maximum lifting speed and traveling with maximum travel performance without acceleration problems. At least two maximum torque curves of different magnitudes are set in advance on a torque curve diagram. Then, the weight the cargo loaded on an attachment is measured. A threshold value for selecting at least two maximum torque curves is determined. If the measured weight is less than the threshold value, the maximum torque curve with a smaller maximum torque value is selected. If the measured weight is not less than the threshold value, the maximum torque curve with a larger maximum torque value is selected. The engine is controlled using the selected maximum torque curve.

3 Claims, 7 Drawing Sheets

FORKLIFT ENGINE CONTROL DEVICE

TECHNICAL FIELD

The present invention relates to a forklift engine control device.

BACKGROUND ARTS

The forklift has attachments such as a mast and a fork as working machines at a front portion of the vehicle body. By operating a working machine operating lever, the working machines are driven to tilt the mast or to lift the fork as an attachment, and the position and posture of the cargo placed on the fork can be changed to a desired position and posture.

The forklift has a vehicle weight ratio of about 1.8 times between an unloaded time and a maximum loaded time. Thus, the vehicle weight ratio is very large.

But, conventionally, engine characteristics were determined in conformity with the maximum loaded time and a maximum travel load time.

Figure 1:
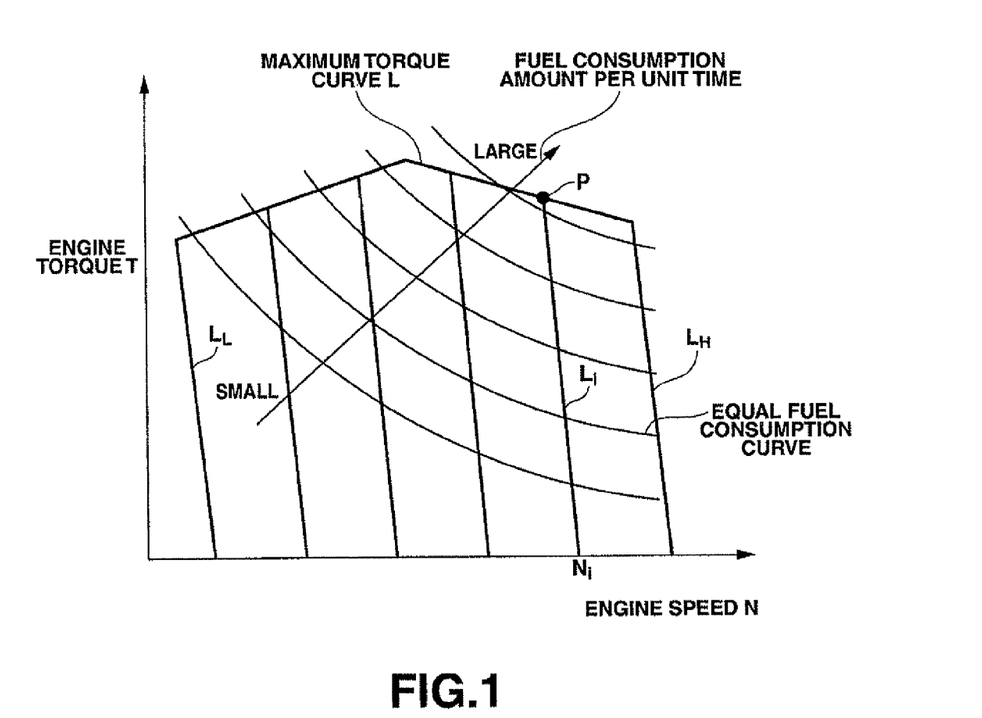
FIG. 1 is a conventional torque curve diagram.

FIG. 1 is a torque curve diagram showing engine output characteristics of a conventional forklift. The horizontal axis indicates an engine speed N, and the vertical axis indicates an engine torque T. L is a maximum torque curve of the engine and fixed to one type. The engine speed N corresponds to an acceleration opening degree.

The maximum torque curve L is set so that the forklift can secure a maximum lifting speed under a maximum imposed load and can secure maximum hill-climbing ability under a maximum load (maximum imposed load and maximum travel load).

Regulation lines LL . . . Li . . . LH are determined for respective engine speeds, namely for respective acceleration opening degrees, and when the acceleration opening degree (engine speed Ni) is determined, a matching point between an engine absorption torque and a load moves along a corresponding regulation line Li while the engine speed N decreases depending on the magnitudes of the load. At a certain engine speed Ni, a matching point is positioned at a point having a maximum torque on the regulation line Li, namely a point P on the maximum torque curve L. Control that increases the engine output torque T while decreasing the engine speed N is realized by mechanical control or electronic control according to an all speed control type governor.

The following Patent Reference 1 discloses an invention that aims to control automatically the power output capacity of the engine depending on a working state of a wheel loader and to select automatically a maximum torque curve of the engine by detecting the working state on the basis of a pressure of a hydraulic cylinder of an arm of the working machine of the wheel loader and an inclinometer of the working machine of the wheel loader.

The following Patent Reference 2 discloses an invention that aims to obtain acceleration characteristics required for a forklift having a battery as a drive source depending on a use situation and sets variably an initial current value supplied to a running motor depending on the weight of the cargo loaded on the forks.

The following Patent Reference 3 discloses an invention in which a forklift is provided with a load measuring device for measuring the load of a cargo placed on its forks, the load measured by the load measuring device is shown on a display, an alarm is issued if the measured load exceeds a predetermined value, and a forward inclination angle of the mast and a travel speed are limited depending on the measured load.

Patent Reference 1: WO2005/024208 A1

Patent Reference 2: Japanese Patent Application Laid-Open No. 2003-54899

Patent Reference 3: Japanese Patent Application Laid-Open No. 2010-6604

DISCLOSURE OF THE INVENTION

Problems to be Solved by the Invention

For a vehicle such as a forklift of which engine speed is controlled by depressing operation of an accelerator pedal, an operator tends to operate the accelerator pedal by "freely depressing" it regardless of a magnitude of a loaded weight load or a travel load. Here, a fuel consumption amount per unit time steadily increases along the torque curve diagram shown in FIG. 1.

Conventionally, the maximum torque curve L is set such that a maximum lifting speed and maximum hill-climbing ability under the maximum imposed load can be secured as shown in FIG. 1. In a suddenly accelerating state in which the accelerator pedal is depressed suddenly when the engine is in a low-speed state (e.g., a low idle speed), a matching point moves transiently along the maximum torque curve regardless of the magnitude of the load, and passes through the maximum fuel consumption range of the engine.

On the other hand, when the engine output is suddenly accelerated in an unloaded or lightly loaded state, the matching point does not need to move along the maximum torque curve, and there is no problem practically in the performance of the vehicle at a lower output level. That is, conventionally, a fuel is transiently consumed uselessly when accelerated suddenly in an unloaded or lightly loaded state, and this uselessness increases as the accelerator operation has an increased number of times of frequently and fully depressing the accelerator pedal.

Thus, when the forklift is in the unloaded or lightly loaded state (light weight load and light travel load) and the accelerator pedal is depressed fully, it is necessary to keep down the fuel consumption.

In addition, when the forklift is loaded with a heavy cargo, it is necessary that the cargo can be lifted at a maximum lifting speed, and traveling can be made with maximum travel performance without acceleration problems in order to secure operability.

The present invention has been made in view of the above circumstances and makes it possible to secure operability by keeping down the fuel consumption when the accelerator pedal is floored in an unloaded or lightly loaded state (light weight load and light travel load) and, when a heavy cargo is loaded, by lifting the cargo at a maximum lifting speed and traveling with maximum travel performance without acceleration problems.

None of the above prior art documents discloses an invention that aims to secure operability by keeping down fuel consumption when the accelerator pedal is floored in an unloaded or lightly loaded state (light weight load and light travel load) and, when a heavy cargo is loaded, by lifting the cargo at a maximum lifting speed and traveling with maximum travel performance without acceleration problems.

Means for Solving the Problem

A first invention relates to an engine control device for a forklift, which is provided with a travel device driven by an engine and a working machine including an attachment driven and lifted by the engine, and which performs matching between an engine absorption torque and a load on an engine torque curve diagram having an engine speed axis and a torque axis by engine control, comprising:

maximum torque curve setting means for setting in advance at least two maximum torque curves of different magnitudes of maximum torque values on the engine torque curve diagram, weight measuring means for measuring the weight of the attachment and a cargo loaded on the attachment, maximum torque curve selecting means for selecting a maximum torque curve having a smaller maximum torque value if the weight measured by the weight measuring means is smaller than a threshold value, and for selecting a maximum torque curve having a larger maximum torque value if the weight measured by the weight measuring means is not less than the threshold value, the threshold value being determined for selecting the at least two maximum torque curves for the weight measured by the weight measuring means, and engine control means for controlling the engine according to the maximum torque curve selected by the maximum torque curve selecting means.

A second invention relates to the engine control device for a forklift according to the first invention, wherein the maximum torque curve setting means sets in advance two maximum torque curves of different magnitudes of maximum torque values, and a maximum torque curve having a larger maximum torque value is set to a maximum torque value at which the forklift can secure a maximum lifting speed under a maximum imposed load and maximum hill-climbing ability under a maximum load.

A third invention relates to the engine control device for a forklift according to the first or second invention, wherein in the maximum torque curve selecting means, a threshold value used when shifting from the state in which the maximum torque curve having the smaller maximum torque value has been selected to the state in which the maximum torque curve having the larger maximum torque value is selected, is determined to be a value larger than a threshold value used when shifting from the state in which the maximum torque curve having the larger maximum torque value has been selected to the state in which the maximum torque curve having the smaller maximum torque value is selected.

Effects of the Invention

According to the present invention, when the forklift is in an unloaded or lightly loaded state (light weight load and light travel load), the engine is controlled according to a maximum torque curve having a smaller maximum torque value, so that the fuel consumption can be kept down when the accelerator pedal is floored.

On the other hand, when a heavy cargo is loaded, the engine is controlled according to a maximum torque curve having a larger maximum torque value, and thus, the cargo can be lifted at a maximum lifting speed, traveling can be made with maximum travel performance without acceleration problems, and it is possible to secure operability.

BEST MODE FOR CARRYING OUT THE INVENTION

Embodiments of the forklift engine control device according to the present invention are described below with reference to the drawings.

Figure 7:
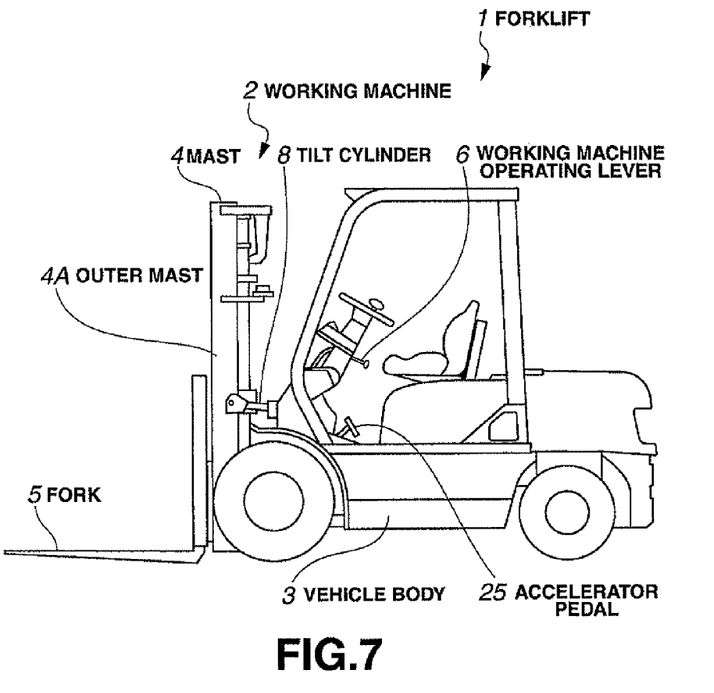
FIG. 7 is a side view of the vehicle body of the forklift.

FIG. 7 is a side view of a vehicle body 3 of a forklift 1. FIG. 2 shows a structure of a working machine 2 of the forklift 1.

As shown FIG. 7, a mast 4 and a fork 5 are disposed as the working machine 2 at the front of the vehicle body 3 of the forklift 1. An outer mast 4A is supported by the vehicle body 3 via a right and left pair of tilt cylinders 8. According to the operation of a working machine operating lever 6, the working machine 2 is driven to tilt the mast 4 or to lift the fork 5 as attachments, and the position and posture of the cargo placed on the fork 5 can be changed to a desired position and posture.

Figure 2A:
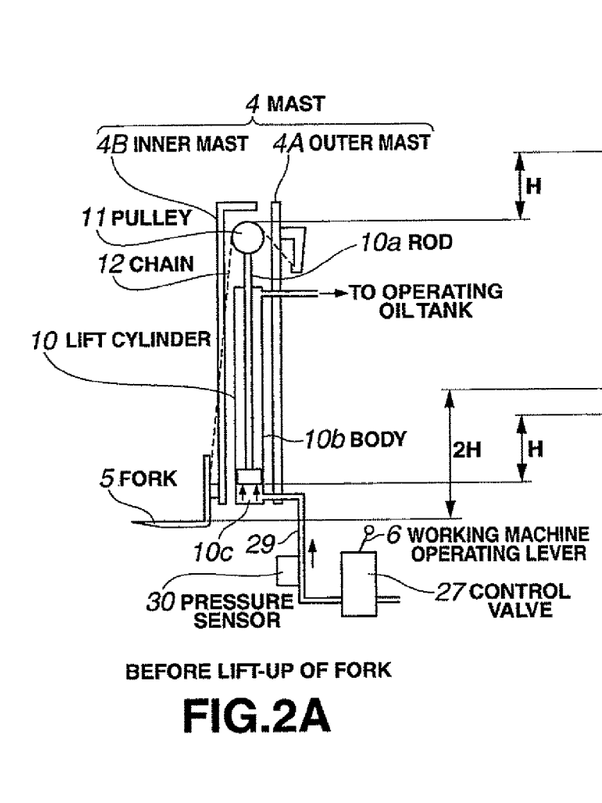
FIG. 2 is a view showing a structure of a working machine of a forklift.
Figure 2B:
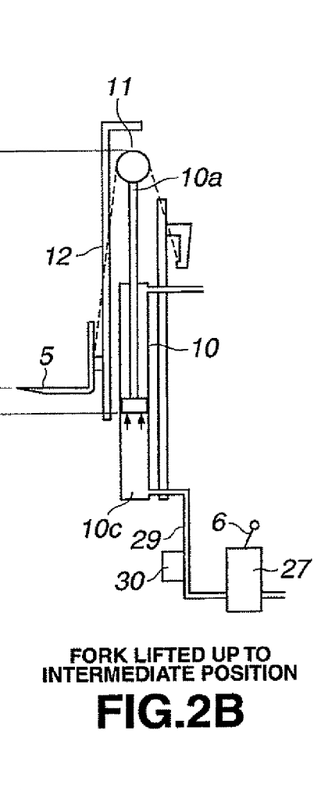
Figure 2C:
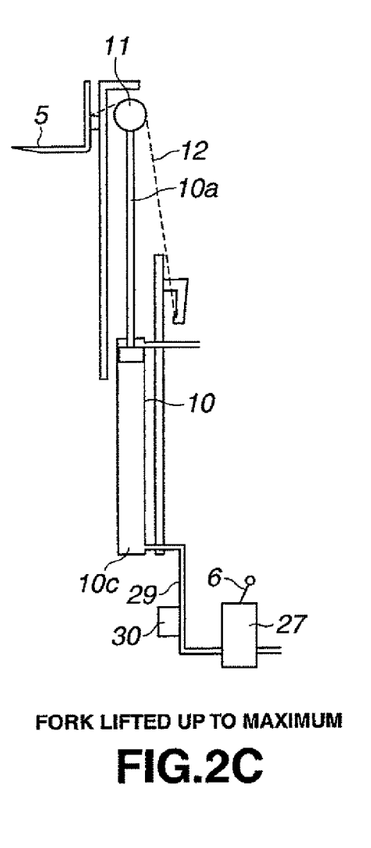

FIGS. 2A, 2B and 2C show respectively a state before the fork 5 is lifted, a state in which the fork 5 is lifted up to an intermediate position, and a state in which the fork 5 is lifted up to a maximum position.

The mast 4 comprises the outer mast 4A and an inner mast 4B.

The outer mast 4A is provided with the inner mast 4B which is freely movable vertically. The inner mast 4B is provided with the fork 5 as the attachment to be freely movable vertically. Bodies 10b of a right and left pair of lift cylinders 10 are fixed to the outer mast 4A so as to have rods 10a upright. An end of the rod 10a of the each lift cylinder 10 is fixed to a pulley 11. The shaft of the pulley 11 is mounted on the inner mast 4B.

A chain 12 is wound around the pulley 11. One end of the chain 12 is fixed to the outer mast 4A, and the other end of the chain 12 is fixed to the fork 5.

Figure 3:
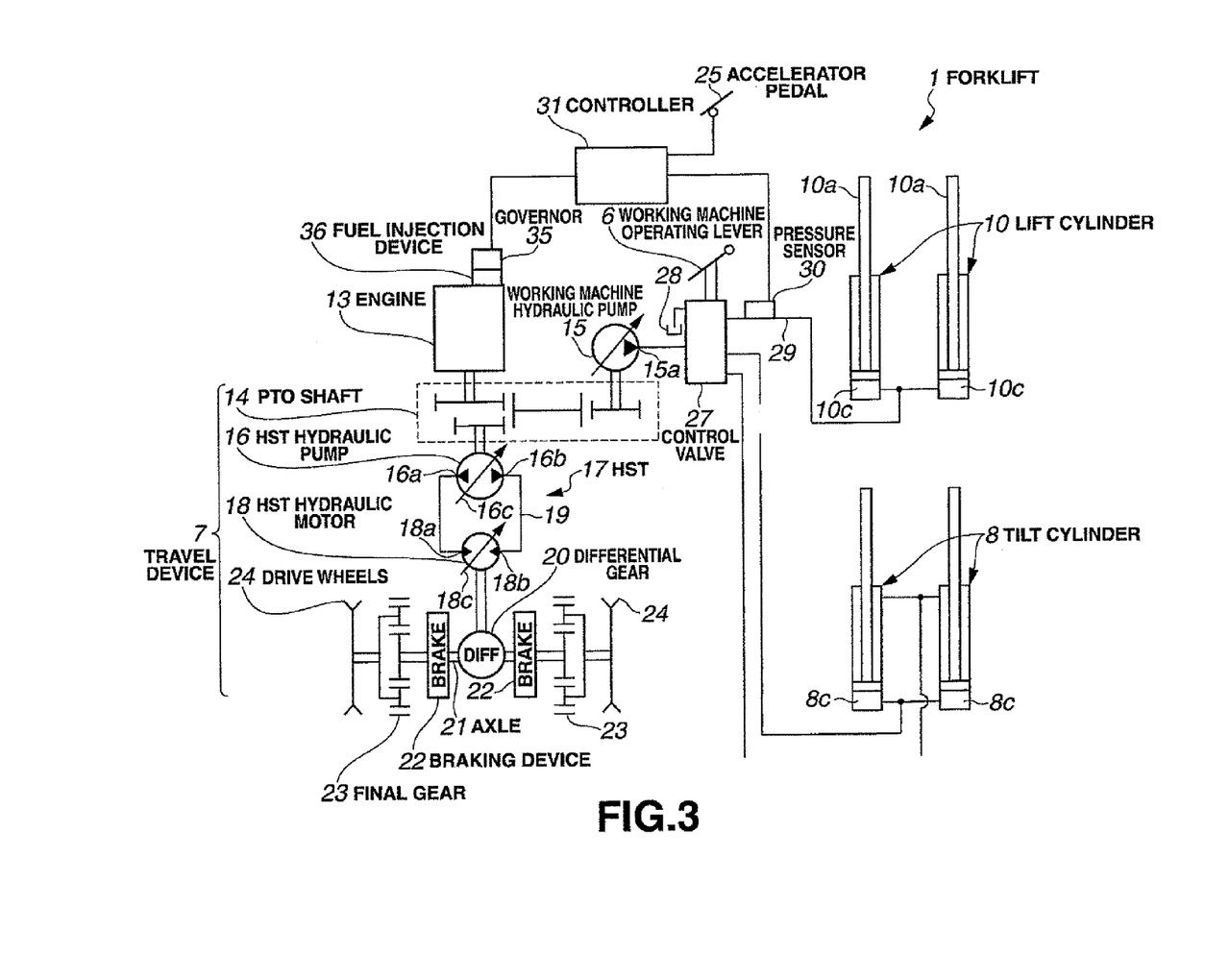
FIG. 3 is a view showing a structure of a power transmission system of the forklift.

FIG. 3 shows a structure of the power transmission system of the forklift 1.

The driving force of an engine 13 is transmitted to a working machine hydraulic pump 15 and an HST hydraulic pump 16 through a PTO shaft 14. The power transmission system from the HST hydraulic pump 16 to drive wheels 24 configures a travel device 7.

A hydro-static transmission (HST) 17 comprises the HST hydraulic pump 16, an HST hydraulic motor 18, and an oil passage 19 which communicates flow-in and flow-out openings 16a and 16b of the HST hydraulic pump 16 respectively with flow-in and flow-out openings 18a and 18b of the HST hydraulic motor 18, and respective tilt angles of a swash plate 16c of the HST hydraulic pump 16 and a swash plate 18c of the HST hydraulic motor 18 are adjusted to change the respective displacements, thereby changing the speed.

The drive force of the HST hydraulic motor 18 is transmitted to an axle 21 via a differential gear 20. The axle 21 is provided with a braking device 22 and a final gear 23. The output axis of the final gear 23 is coupled with the drive wheels 24. Therefore, when an accelerator pedal 25 is depressed and an unshown driving-direction lever 26 is selected in a forward direction or a reverse direction while the engine 13 is operating, the drive wheels 24 are rotationally driven to make the vehicle travel forward or backward.

The working machine operating lever 6 is a lever formed of, for example, a joy stick, and performs raising or lowering operation of the lift or tilting operation according to the operated direction. When the working machine operating lever 6 is operated in a tilting operation direction, pressure oil discharged from a discharge port 15a of the working machine hydraulic pump 15 is supplied to oil chamber 8c of the tilt cylinder 8 via a control valve 27. Thus, the tilt cylinders 8 operate, and the mast 4 shown in FIG. 2 or FIG. 7 perform the tilt operation.

When the working machine operating lever 6 is operated in a lift raising direction, the pressure oil discharged from the discharge port 15a of the working machine hydraulic pump 15 is supplied from the control valve 27 to oil chamber 10c of the lift cylinder 10 through an oil passage 29. Thus, the rod 10a of the lift cylinder 10 moves upward as shown in FIG. 2. Accordingly, the chain 12 is pushed upward together with the pulley 11, the inner mast 4B is moved upward, and the fork 5 is lifted with respect to the inner mast 4B. The fork 5 is lifted with an amount of movement 2H which is two times larger than an amount of movement (amount of movement of the pulley 11) H of the rod 10a.

When the working machine operating lever 6 is operated in the lift lowering direction, the pressure oil in the oil chamber 10c of the lift cylinder 10 is released into a tank 28 via the control valve 27 through the oil passage 29. Thus, the rod 10a of the lift cylinder 10 moves downward under its own weight in FIG. 2. Therefore, the chain 12 lowers together with the pulley 11, the inner mast 4B moves downward, and the fork 5 lowers with respect to the inner mast 4B.

When the working machine operating lever 6 is positioned in neutral, the opening of the control valve 27 is closed, and supply and discharge of the pressure oil to and from the oil chamber 10c of the lift cylinder 10 are stopped. Thus, the rod 10a of the lift cylinder 10 is stopped from moving and the height of the fork 5 is maintained in FIG. 2.

The oil passage 29 which communicates the oil chamber 10c of the lift cylinder 10 and the control valve 27 is provided with a pressure sensor 30. A holding pressure corresponding to the weights of the forks 5 as the attachment and the cargo loaded on the fork 5 is generated in operating oil in the oil passage 29.

Figure 4:
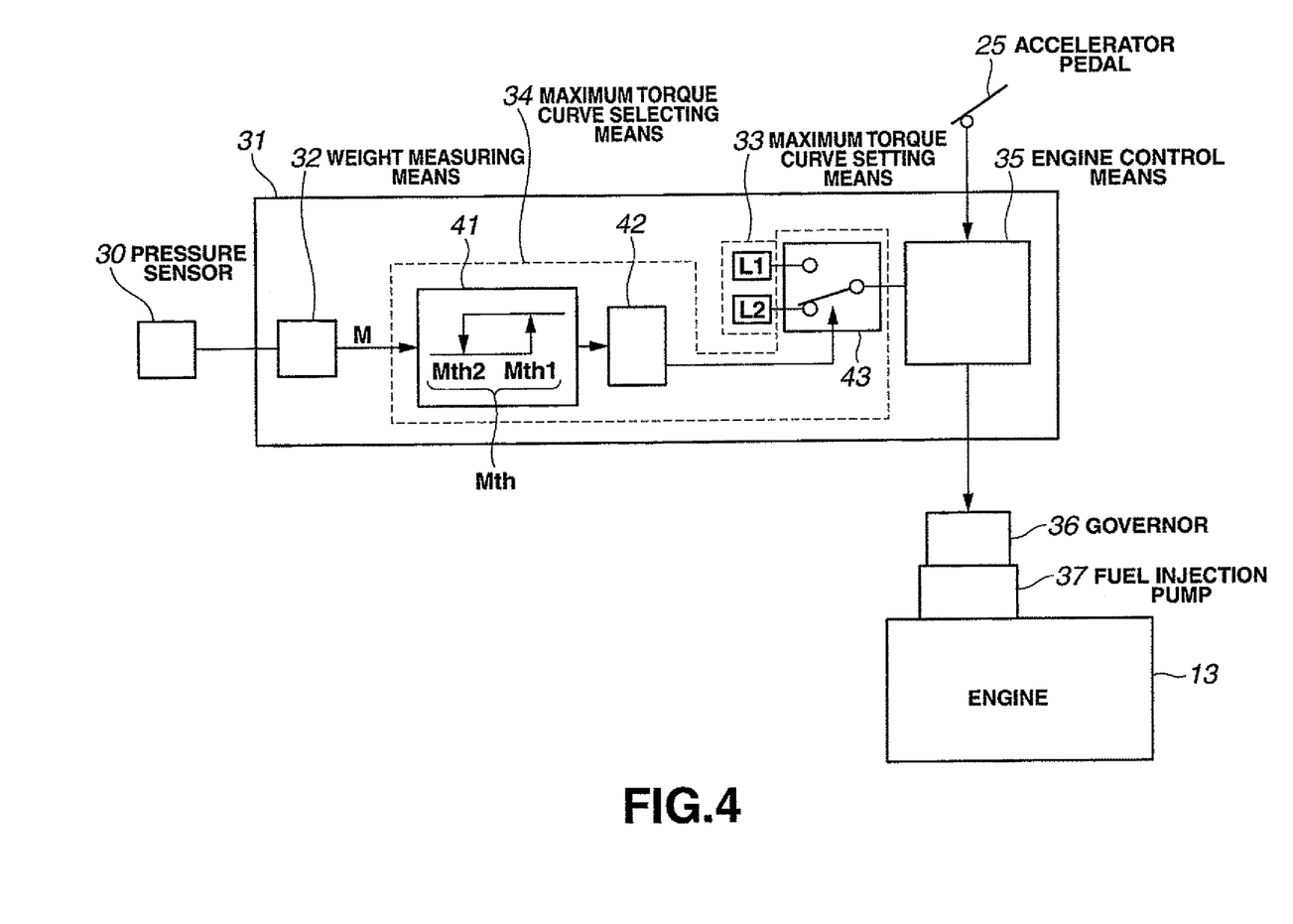
FIG. 4 is a view showing a structure of a controller for controlling an engine.

Therefore, the weights of the forks 5 as the attachment and the cargo loaded on the forks 5 can be measured by detecting the pressure of the operating oil in the oil passage 29, namely the lift cylinder 10 holding pressure, by the pressure sensor 30. FIG. 4 shows a structure of a controller 31 for controlling the engine 13.

The controller 31 is provided with weight measuring means 32, maximum torque curve setting means 33, maximum torque curve selecting means 34, and engine control means 35.

To the controller 31, the detection signal of the pressure sensor 30 and a signal indicating a depressed amount of the accelerator pedal 25 are input.

The weight measuring means 32 calculates an average holding pressure by sampling plural times the holding pressure of the lift cylinder 10 detected by the pressure sensor 30 and averaging. For example, an average holding pressure of 100 times (1 sec) is calculated with a sampling time set to 10 msec. The calculated average holding pressure corresponds to a weight M totaled from the weight of the forks 5 as the attachment and the weight of the cargo.

The weight M may be measured accurately by the weight measuring means 32. That is, the weight M totaled from the weight of the forks 5 as the attachment and the weight of the cargo can be calculated on the basis of the holding pressure of the lift cylinder 10 detected by the pressure sensor 30 and a correction coefficient. The correction coefficient is determined on the basis of the weight of the already known fork 5, the weight of a lift bracket 9 and the weight of the inner mast 4B.

The maximum torque curve setting means 33 sets in advance two maximum torque curves of different magnitudes of maximum torque values on a torque curve diagram.

Figure 5:
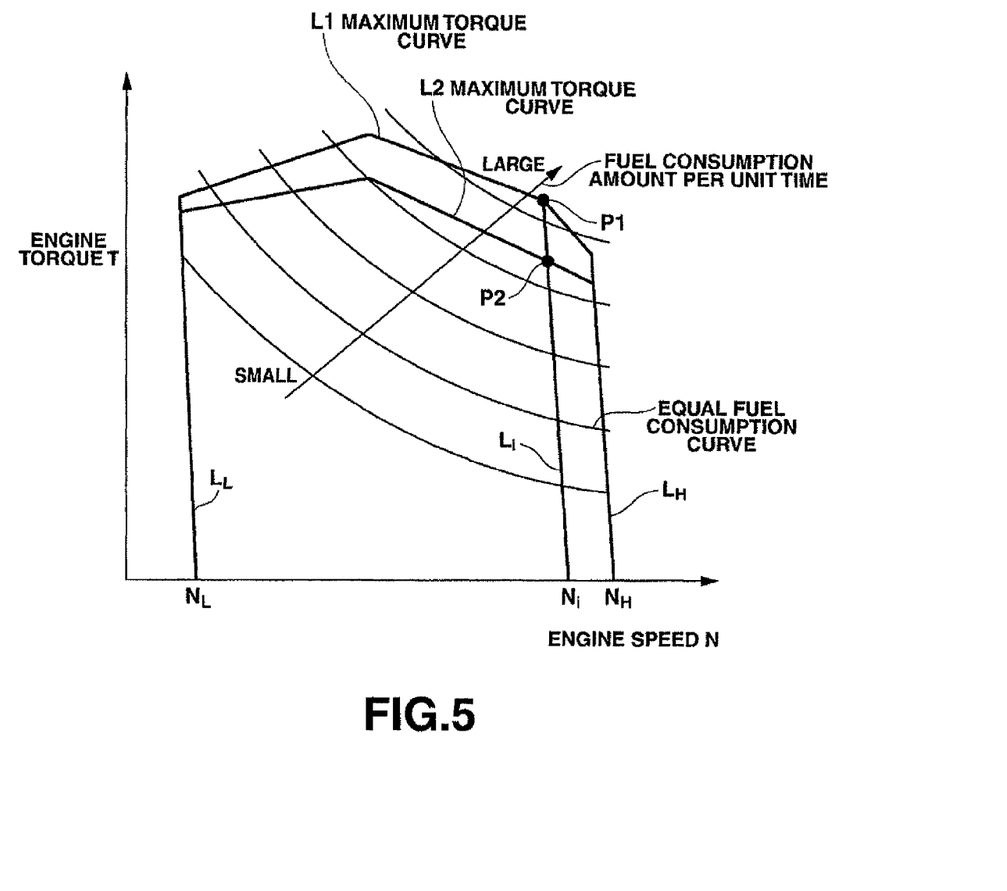
FIG. 5 is a torque curve diagram of an embodiment.

FIG. 5 is a torque curve diagram corresponding to FIG. 1, showing output characteristics of the engine 13 of the forklift 1 of an embodiment. The horizontal axis shows an engine rotation speed N and the vertical axis shows an engine torque T. L1 is a maximum torque curve having a larger maximum torque value, and L2 is a maximum torque curve having a smaller maximum torque value.

The maximum torque curve L1 is set to have a maximum torque value at which the forklift 1 can secure a maximum lifting speed under a maximum imposed load and can secure a maximum hill-climbing ability under a maximum load. That is, the maximum torque value is set so that operability can be secured by lifting at a maximum lifting speed and traveling with maximum travel performance without acceleration problems once a heavy load is loaded.

The maximum torque curve L2 is set to have a maximum torque value at which operability can be secured by suppressing fuel consumption when the accelerator pedal 25 is floored in an unloaded or lightly loaded state (light weight load and light travel load) and by lifting the forks 5 at a maximum lifting speed and traveling with maximum travel performance without acceleration problems in an unloaded or lightly loaded state (light weight load and light travel load).

The maximum torque curve selecting means 34 of the controller 31 comprises a cargo judgment section 41, a time judgment section 42, and a selection section 43.

The cargo judgment section 41 is set to have a threshold value Mth for selecting two maximum torque curves L1 and L2 with respect to the weight M measured by the weight measuring means 32. But, the threshold value Mth is set in two types to provide hysteresis in order to prevent control hunting.

That is, a threshold value Mth1 which is used when shifting from a state in which the maximum torque curve L2 having a smaller maximum torque value has been selected to a state in which the maximum torque curve L1 having a larger maximum torque value is selected is determined to be a value larger than a threshold value Mth2 which is used when shifting from a state in which the maximum torque curve L1 having a larger maximum torque value has been selected to a state in which the maximum torque curve L2 having a smaller maximum torque value is selected.

Figure 8:
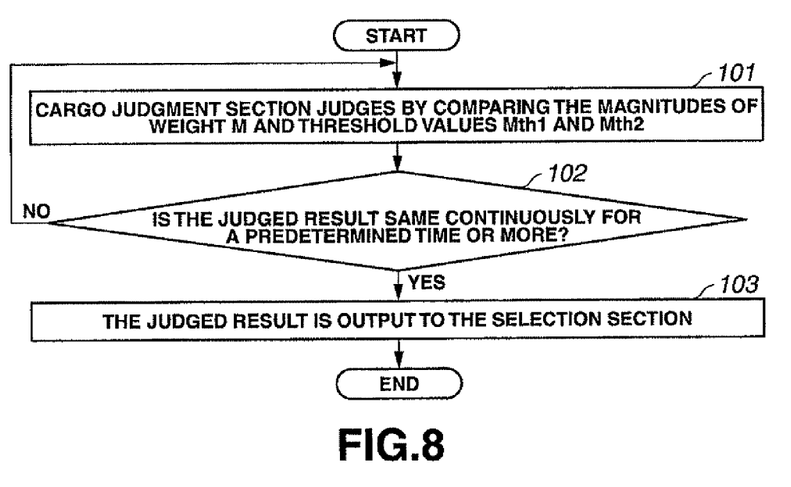
FIG. 8 is a flow chart showing a procedure of judging the weight of a cargo.

A procedure of judging the weight M measured by the weight measuring means 32 is described below with reference to FIG. 8.

The cargo judgment section 41 judges by comparing the magnitudes of the weight M measured by the weight measuring means 32 and the threshold values Mth1 and Mth2 (Step 101).

The time judgment section 42 judges whether or not the judged result of the cargo judgment section 41 is same continuously for a predetermined time or more (Step 102). If the judged result of the cargo judgment section 41 is same continuously for a predetermined time (e.g., 1 sec) or more (judged Y in Step 102), the judged result of the cargo judgment section 41 is output to the selection section 43 (Step 103). The time judgment is provided taking into consideration that the holding pressure of the lift cylinder 10 might be varied due to bounds or the like caused while the forklift 1 is traveling.

The selection section 43 selects a maximum torque curve on the basis of the judged result of the cargo judgment section 41. That is, if the judged result that the weight M measured by the weight measuring means 32 is smaller than the threshold value Mth2 is input, the maximum torque curve L2 having a smaller maximum torque value is selected, and if the judged result that the weight M measured by the weight measuring means 32 is not less than the threshold value Mth1 is input, the maximum torque curve L1 having a larger maximum torque value is selected.

Thus, when the maximum torque curve is selected by the maximum torque curve selecting means 34, the information on the selected maximum torque curve is output to the engine control means 35.

The engine 13 is controlled by the engine control means 35, a governor 36 and a fuel injection pump 37.

The engine control means 35 limits the engine output torque to a maximum torque value or less which is defined by the selected maximum torque curve or less, generates a control command for obtaining the engine speed N corresponding to the depressed amount of the accelerator pedal 25, and outputs it to the governor 36.

The governor 36 generates a fuel injection amount command, which becomes the engine speed N given as a control command and limits the engine output torque T to the maximum torque value or below defined by the selected maximum torque curve, and outputs it to the fuel injection pump 37. The fuel injection pump 37 injects the fuel to the engine 13 such that the fuel injection amount given as the fuel injection amount command can be obtained.

The governor 36 is an all speed control type governor and performs mechanical control or electronic control.

It is assumed that the maximum torque curve L2 having a smaller engine torque value is selected as shown in FIG. 5.

Regulation lines LL . . . Li . . . LH are determined for respective engine speeds N, namely respective acceleration opening degrees. When an acceleration opening degree (engine speed Ni) is determined, a matching point between the engine absorption torque and the load moves along a corresponding regulation line Li while the engine speed N decreases depending on the magnitude of the load. The matching point at a certain engine speed Ni is positioned at a point P2 having a maximum torque on the regulation line Li, namely at the point P2 on the maximum torque curve L2. The maximum torque point P2 on the maximum torque curve L2 is a point having a torque value smaller than the torque value at the corresponding maximum torque point P1 on the maximum torque curve L1 having a larger engine torque value at the same engine speed Ni.

Then, the effects of this embodiment are described with reference to FIG. 6.

Figure 6:
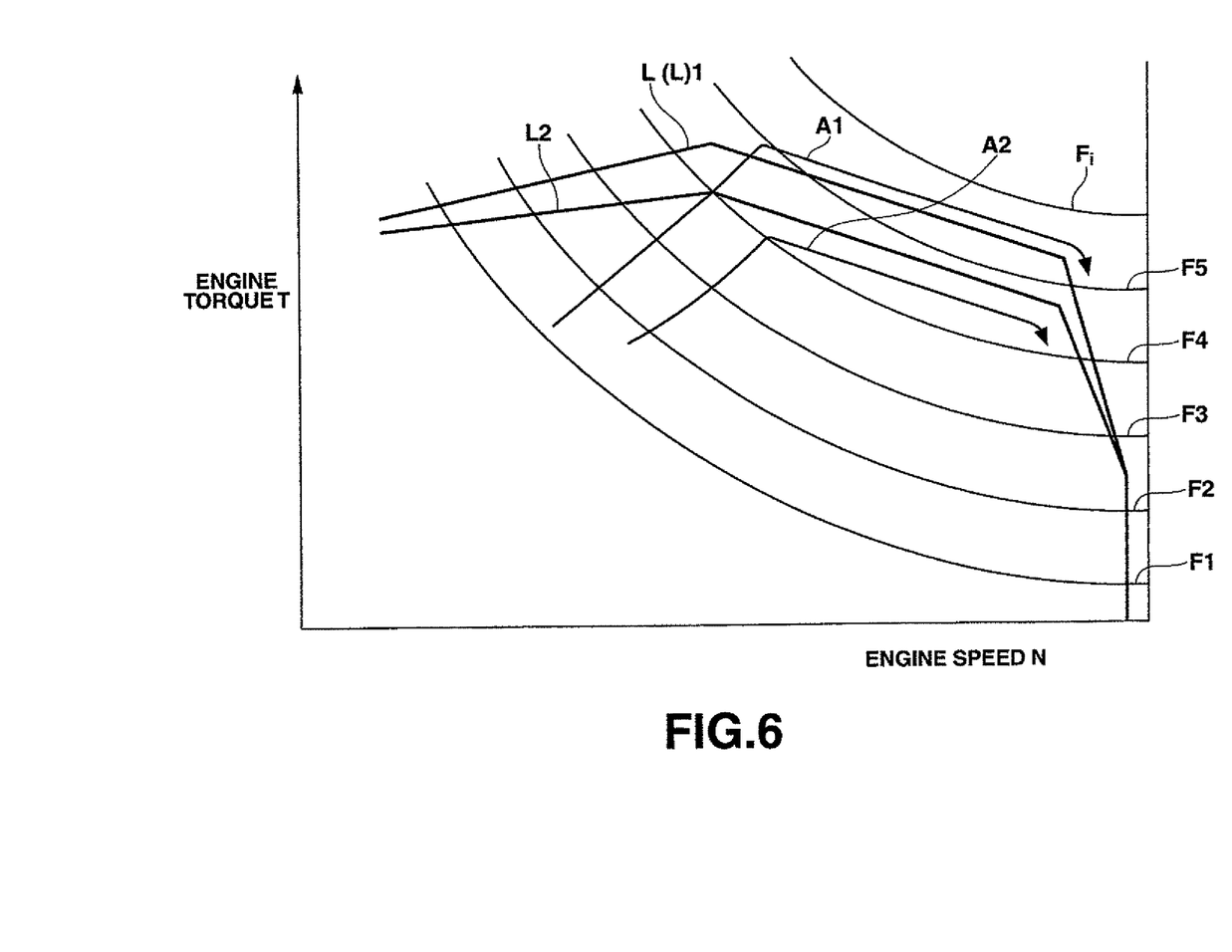
FIG. 6 is a view comparing an accelerating path of a conventional engine and an accelerating path of the engine of the embodiment used to explain the effects of the embodiment.

FIG. 6 shows maximum torque curves L and L2 on a torque curve diagram of the engine 13 having an axis of the engine speed N and an axis of the torque T similar to FIG. 5 and also shows equal fuel consumption curves F1, F2 . . . Fi . . . The equal fuel consumption curves F1, F2 . . . Fi . . . indicate properties on the torque curve diagram that the fuel consumption amount of the engine 13 becomes equal according to the engine speed N and the engine torque T.

The maximum torque curve L is a maximum torque curve which was conventionally fixed to one type shown in FIG. 1, and the magnitude of the torque value corresponds to the maximum torque curve L1.

In FIG. 6, A1 shows an outline of an accelerating path of the engine 13 when control is performed according to conventional technology. And, A2 shows an outline of an accelerating path of the engine 13 when control is performed according to this embodiment.

It is apparent from the comparison of the above accelerating paths that, even when the accelerator pedal 25 is floored in an unloaded or lightly loaded state (light weight load and light travel load) according to this embodiment, fuel consumption can be kept low. For example, about 4% of fuel consumption suppression effect was obtained by "fuel consumption evaluation in a V-shape course" which is one of fuel consumption evaluation patterns of the forklift 1.

Moreover, the fork 5 can be lifted at a maximum lifting speed in an unloaded or lightly loaded state (light weight load and light travel load) and traveling can be made with maximum travel performance without acceleration problems, and thus, operability can be secured.

On the other hand, the maximum torque curve L1 shown in FIG. 5 is selected once a heavy cargo is loaded. Therefore, the heavy cargo can be lifted at a maximum lifting speed, traveling can be made with maximum travel performance without acceleration problems, and operability under a high load can be secured. In addition, once the cargo is loaded, the forklift 1 has a constant load unless the cargo is removed from the fork 5, and thus, the maximum torque curve L1 is not switched unintendedly to the maximum torque curve L2 while the cargo is being loaded.

According to this embodiment, the engine torque value can be kept down from the viewpoint of the overall work aspect even if the accelerator pedal 25 is operated roughly, it also contributes to the improvement of a heat balance.

The above descriptions have been made on the assumption that the attachment is the fork 5. But, even when an attachment other than the fork 5 is mounted on the forklift 1, the present invention can also be applied in the same manner. Since the weight measuring means 32 can measure not only the weight of the cargo loaded on the attachment but also the weight M with the weight of the attachment itself added, it is possible to suppress fuel consumption and to improve workability in all working states by changing the threshold value Mth (threshold values Mth1 and Mth2) depending on the types of the attachment.

It was described above with reference to the example that two maximum torque curves of different magnitudes of maximum torque values were set and one of them was selected, but it is also possible to practice by setting three or more maximum torque curves having different magnitudes of maximum torque values and selecting one from them.

The invention claimed is:

1. An engine control device for a forklift, which is provided with a travel device driven by an engine and a working machine including an attachment driven and lifted by the engine, and which performs matching between an engine absorption torque and a load on an engine torque curve diagram having an engine speed axis and a torque axis by engine control, comprising:
maximum torque curve setting means for setting in advance at least two maximum torque curves of different magnitudes of maximum torque values on the torque curve diagram,
weight measuring means for measuring the weight of the attachment and a cargo loaded on the attachment,
maximum torque curve selecting means for selecting a maximum torque curve having a smaller maximum torque value if the weight measured by the weight measuring means is smaller than a threshold value, and for selecting a maximum torque curve having a larger maximum torque value if the weight measured by the weight measuring means is not less than the threshold value, the threshold value being determined for selecting the at least two maximum torque curves for the weight measured by the weight measuring means, and engine control means for controlling the engine according to the maximum torque curve selected by the maximum torque curve selecting means.

2. The engine control device for a forklift according to claim 1, wherein the maximum torque curve setting means sets in advance two maximum torque curves of different magnitudes of maximum torque values, and a maximum torque curve having a larger maximum torque value is set to a maximum torque value at which the forklift can secure a maximum lifting speed under a maximum imposed load and maximum hill-climbing ability under a maximum load.

3. The engine control device for a forklift according to claim 1, wherein in the maximum torque curve selecting means, a threshold value used when shifting from the state in which the maximum torque curve having the smaller maximum torque value has been selected to the state in which the maximum torque curve having the larger maximum torque value is selected, is determined to be a value larger than a threshold value used when shifting from the state in which the maximum torque curve having the larger maximum torque value has been selected to the state in which the maximum torque curve having the smaller maximum torque value is selected.

* * * * *